April 28, 1970     G. N. BORCHARDT ET AL     3,508,386
IMPLEMENT COUPLING AND SUPPORTING APPARATUS
Filed Jan. 8, 1968     3 Sheets-Sheet 1
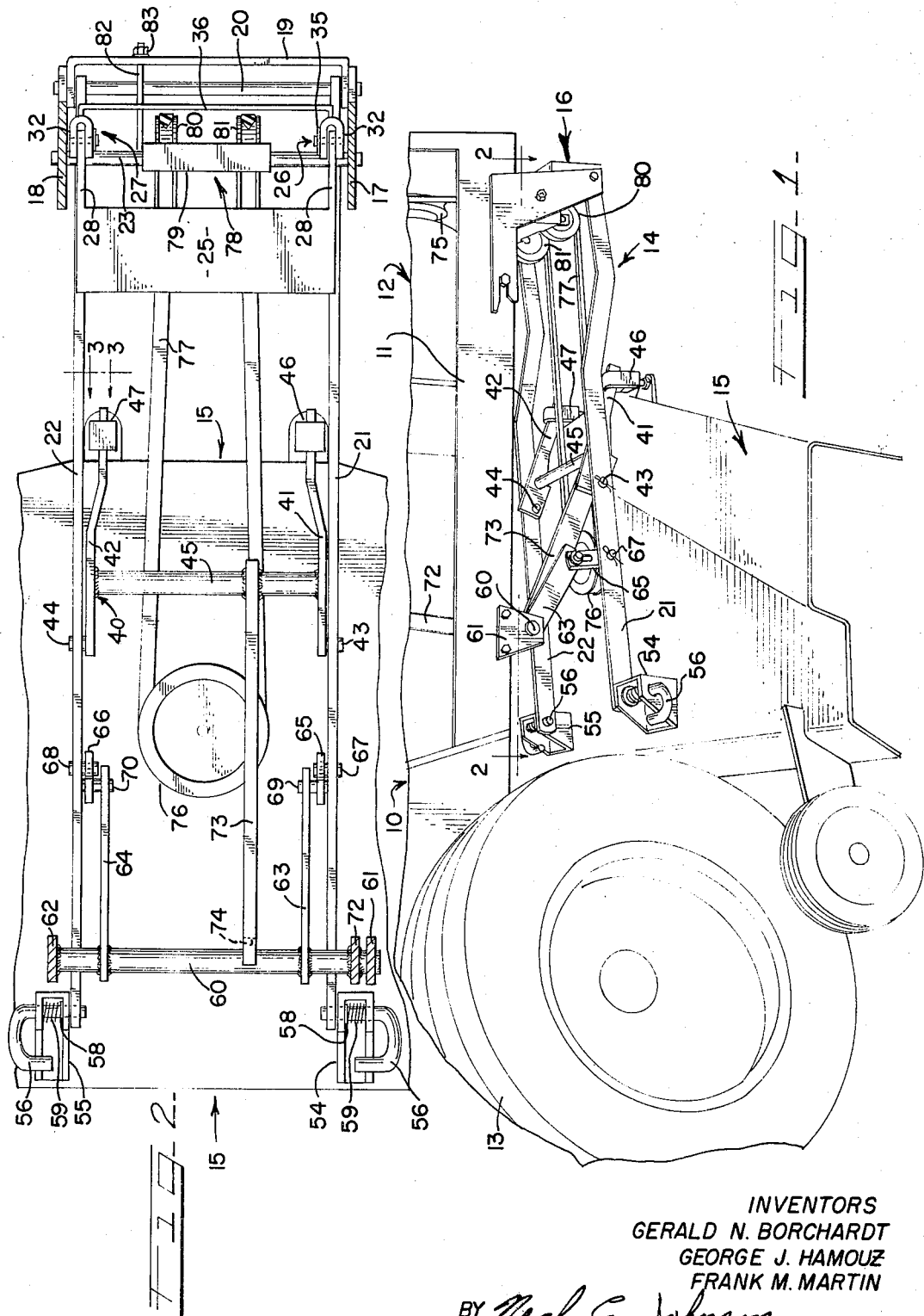
INVENTORS
GERALD N. BORCHARDT
GEORGE J. HAMOUZ
FRANK M. MARTIN
BY Neal C. Johnson
ATT'Y.

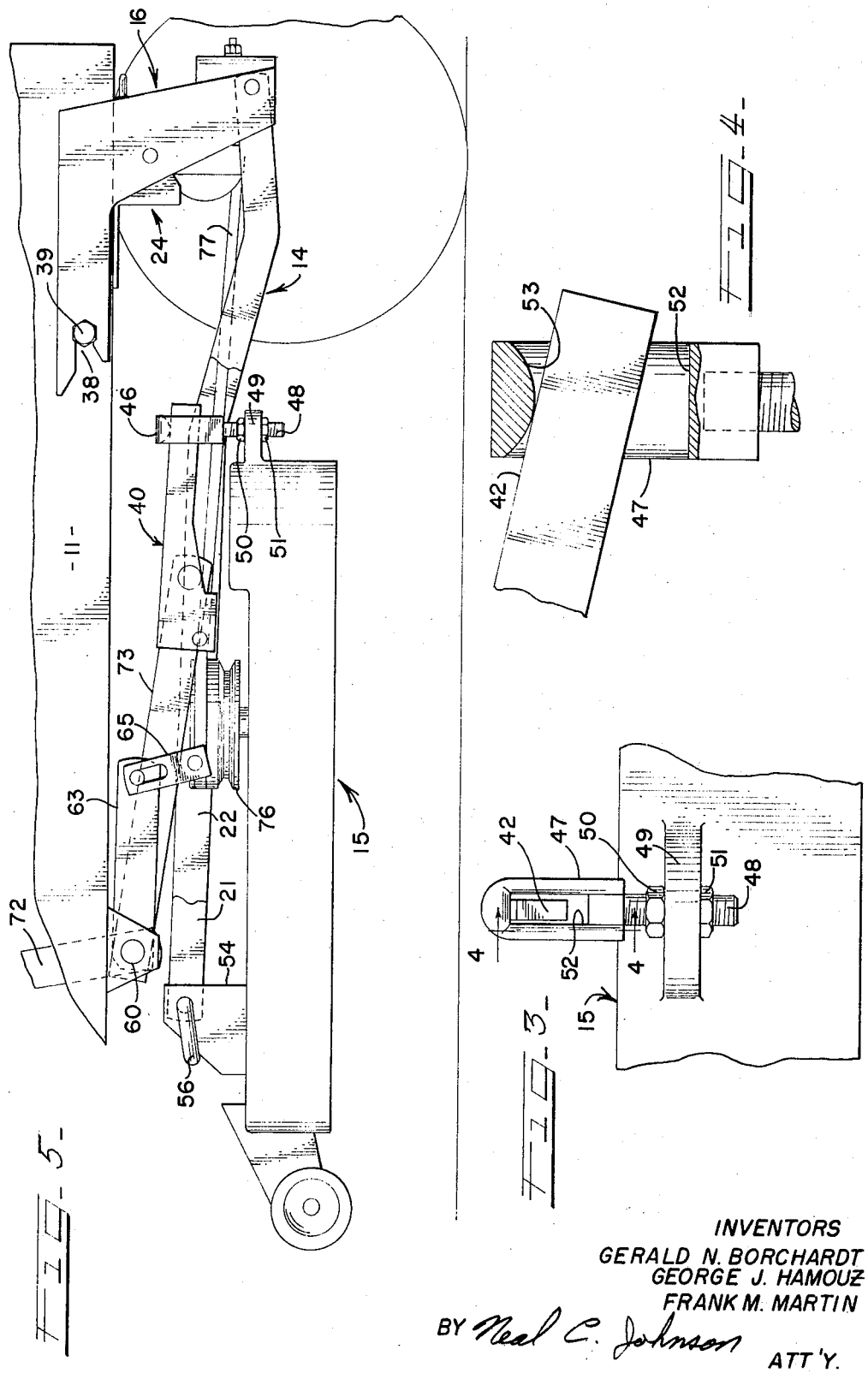

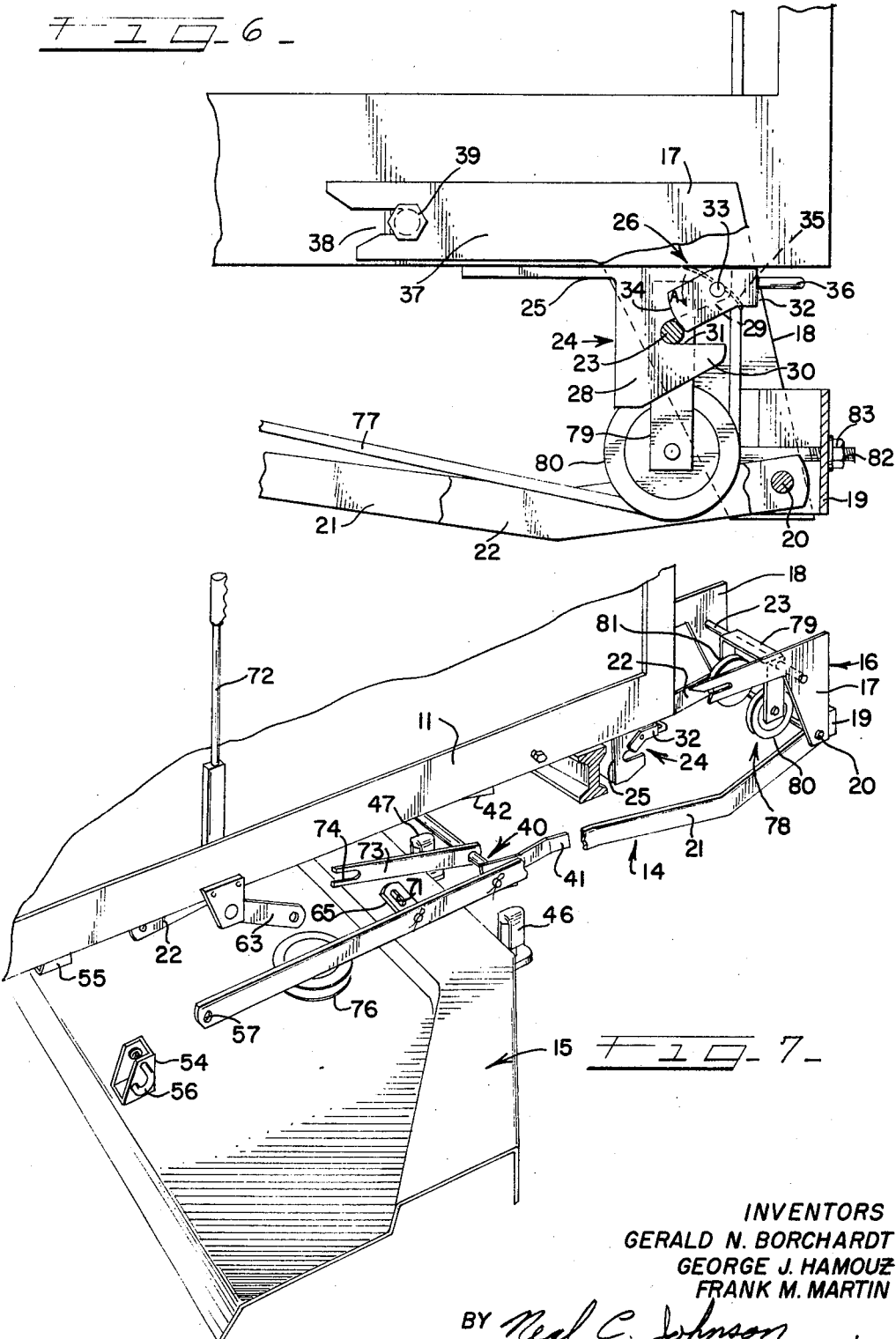

United States Patent Office 3,508,386
Patented Apr. 28, 1970

---

3,508,386
IMPLEMENT COUPLING AND SUPPORTING APPARATUS
Gerald N. Borchardt and George J. Hamouz, Clarendon Hills, and Frank M. Martin, Glen Ellyn, Ill., assignors to International Harvester Company, Chicago, Ill., a corporation of Delaware
Filed Jan. 8, 1968, Ser. No. 696,379
Int. Cl. A01d *35/26*
U.S. Cl. 56—25.4                          10 Claims

ABSTRACT OF THE DISCLOSURE

An apparatus for quickly coupling a mower beneath the midsection of a tractor for vertical lifting and lowering movement. A draft linkage assembly is coupled through quick coupling means to the forward and rearward portions of the mower. The draft linkage assembly is pivotable from a mounting or anchor frame mountable on a self-locking hitch secured on the forward portion of the tractor. A lifting structure connects the draft linkage assembly to the tractor for raising and lowering the mower.

BACKGROUND OF THE INVENTION

Field of the Invention

The invention relates generally to an apparatus for mounting and supporting an implement from a tractor and more particularly to an apparatus for quick-coupling a mower beneath the tractor for vertical lifting and lowering movement.

Description of the prior art

Supporting and lifting linkages have been devised for supporting an implement beneath a tractor for vertical lifting and lowering movement. An example of such a linkage is disclosed in U.S. Patent No. 3,283,486 issued to Marek et al. While such a linkage system is adequate for the stated purposes, a problem resides in the speed and ease with which the implement and supporting linkage may be coupled to and uncoupled from the tractor. In the Marek system the mower is coupled to the linkage assembly by means including pins and cotter keys and the linkage assembly is bolted to the tractor. Accordingly, tools are required to complete the various connections with the result that considerable time and effort is expended.

SUMMARY

The present invention provides a support and coupling apparatus which solves the above problems. The apparatus provides means for quick-coupling a linkage assembly to the tractor and further includes means for quick-coupling an implement to the linkage assembly. Tools are not required to complete all of the various connections with the result that an implement may be mounted on a tractor with a minimum of time and effort.

BRIEF DESCRIPTION OF THE DRAWINGS

FIGURE 1 is a fragmentary perspective view of the supporting and coupling apparatus of the invention mounted on a tractor and to which a mower is connected;

FIGURE 2 is a sectional view of the supporting and coupling apparatus taken generally in the direction of arrows 2—2 of FIGURE 1;

FIGURE 3 is a fragmentary elevation view taken in the direction of arrow 3 of FIGURE 2 illustrating a connection between the mower and the linkage assembly of the invention;

FIGURE 4 is a fragmentary sectional view taken in the direction of arrows 4—4 of FIGURE 3;

FIGURE 5 is a fragmentary side elevation view of the linkage assembly and mower in a raised position;

FIGURE 6 is a fragmentary side elevation view of the forward portion of the linkage assembly coupled to the forward portion of the tractor; and, FIGURE 7 is a fragmentary perspective view illustrating the linkage assembly and mower prior to being coupled to the tractor.

DESCRIPTION OF THE PREFERRED EMBODIMENT

Referring first to FIGURE 1, there is shown the lower portion of a tractor 10 having a longitudinal frame 11 mounting an engine 12 proximate to the forward end thereof. One of the rear traction wheels is illustrated at 13. It will be understood that the front steering wheels are not illustrated so as to better illustrate the invention to be described. In accordance with the invention a draft linkage assembly 14 is disposed longitudinally beneath the tractor frame 11 and is coupled to a rotary type mower 15 suspended beneath the linkage assembly 14.

In accordance with an important feature of the invention the draft linkage assembly is mountable on the tractor by means including an anchor frame shown generally at 16. As best shown in FIGURES 2 and 7 the anchor frame 16 includes a pair of anchor plates 17 and 18 spaced laterally of the tractor frame 11 so as to be disposed on opposite sides thereof as shown. The anchor plates 17 and 18 are rigidly interconnected by means of a brace 19 extending thereacross to form a rigid structure.

The draft linkage assembly 14 is adapted to be pivotally supported from the anchor frame 16. Toward that end, the anchor frame 16 includes a rod 20 mounted between the anchor plates 17 and 18 near the lower ends thereof. The rod 20 serves to mount a pair of draft links 21 and 22 which extend rearwardly therefrom beneath the tractor frame 11 as shown. A mounting rod 23 extends between the anchor plates 17 and 18 for purposes to be described.

In accordance with an important feature of the invention, a self-locking hitch assembly 24 is mounted on the forward portion of the tractor for mounting the draft linkage assembly 14 on the tractor in response to movement of the anchor frame 16 into the hitch assembly. As best shown in FIGURES 2, 6 and 7, the hitch assembly 24 includes an angle plate 25 welded or similarly secured across the underside of the tractor frame 11 forwardly and above the normal position of the front axle of the tractor.

The hitch assembly further includes a pair of implement-receiving socket assemblies 26 and 27 extending forwardly from opposite ends respectively of the angle plate 25. Each of the socket assemblies 26 and 27 is substantially identical in construction and therefore a description of one will suffice for all. As best shown in FIGURE 6, the socket assembly 26 includes a flange 28 extending at right angles from the angle plate 25. In practice, the flange 28 is formed integrally with the plate 25 and is simply bent at right angles with respect thereto. The flange 28 includes upper and lower portions 29 and 30 which are vertically spaced to define a forwardly opening slot 31 therebetween.

Each of the socket assemblies 26 and 27 includes latch means for purposes to be described. The latch means includes a lock member 32 pivotally coupled to the upper portion 29 by means of a pin 33. The lock member 32 is preferably U-shaped as viewed in plan (FIGURE 2) so as to have identical portions disposed on opposite sides of the flange 28 as shown. As best shown in FIGURE 6, the lock member 32 includes a downwardly inclined portion 34 extending at least partially across the slot 31 when pivoted in the position shown.

A spring 35 is wound a few turns around the pin 33 and terminates in one end bent under the lock member 32 and the other end bearing against the underside of the tractor frame 11. The spring 35 tends to pivot the lock member 32 about the pin 33 in the direction of arrow A in FIGURE 6. The engagement of the top edge of the lock member 32 against the underside of the frame 11 retains the lock member in the position shown.

In the illustrated embodiment of the invention, the respective lock members of the socket assemblies 26 and 27 may be interconnected by a transverse bar 36. Accordingly, the lock members are pivotable in unison.

It will be apparent that the anchor frame 16 is constructed to be received in the socket assemblies 26 and 27. The lock member 32 retains the rod 23 in the slot 31. In conjunction with this arrangement each of the anchor plates 17 and 18 includes a fork portion 37 defining a rearwardly opening slot 38. A bolt 39 is mounted on each side of the tractor frame 11 and disposed to fit within the slot 38 as the anchor frame 16 is mounted in the socket assemblies.

The draft linkage assembly 14 includes means for swingably suspending the forward portion of the mower 15 for vertical lifting and lowering movement. Toward that result a unitary frame 40 is pivotally mounted between the draft links 21 and 22. As best shown in FIGURES 1 and 2, the frame includes a pair of arms 41 and 42 pivotally connected to the draft links 21 and 22, respectively, by a pair of pins 43 and 44, respectively. A brace 45 is rigidly secured between the arms 41 and 42 to form a rigid structure.

A pair of collars 46 and 47 are mounted on the forward portion of the mower 15 for coupling to the forward ends of the arms 41 and 42, respectively. As best shown in FIGURES 3 and 5 each of the collars 46 and 47 is fixed on a bolt 48 extending vertically through a flange 49 projecting forwardly from the mower. The bolt 48 is secured on the flange 49 by a pair of lock nuts 50 and 51.

As best shown in FIGURES 3 and 4, each collar is formed to define an opening 52 extending therethrough longitudinally of the tractor and the draft linkage assembly. The arms 41 and 42 are adapted to be telescopically received within the openings in the respective collars 46 and 47. The opening 52 in each collar is defined by a convex top surface 53 adapted to bear against the respective arms 41 and 42 as shown.

In accordance with another feature of the invention, the rearward portion of the mower is also adapted to be quick-coupled to the draft linkage assembly. Toward that result, a pair of brackets 54 and 55 are mounted on the rearward portion of the mower in position to be coupled to the rearward ends of the draft links 21 and 22, respectively. As best shown in FIGURES 1 and 2, a J-shaped locking pin 56 is slidably mounted on each of the brackets 54 and 55 for fitting into an opening 57 defined through each of the draft links 21 and 22. A washer 58 is rigidly mounted on each of the locking pins 56 and a coil spring 59 is disposed around the pin and interposed between the washer 58 and the bracket. Accordingly, the spring 59 normally biases the pin 56 into the locking position shown in FIGURE 2.

The draft linkage assembly and attached implement are adapted to be raised and lowered through lift means operable by the tractor operator. A rockshaft 60 is supported transversely of and beneath the tractor by a pair of brackets 61 and 62 mounted on opposite sides of the tractor frame 11. As best shown in FIGURE 2, a pair of lift arms 63 and 64 are rigidly connected to the rockshaft 60 and extend downwardly and forwardly therefrom in spaced parallel relation. A pair of lifting links 65 and 66 are pivotally connected to the draft means 21 and 22, respectively, by a pair of pins 67 and 68, respectively. The lift arms 63 and 64 are connected to the lifting links 65 and 66, respectively, by a pair of pins 69 and 70, respectively. The pins 69 and 70 each extend through an elongated slot 71 defined through each of the lifting links 65 and 66 to provide lost-motion connections. A hand lever 72 of suitable construction is secured on the rockshaft 60 by which the lift means may be actuated.

In order to provide that the mower is lifted and lowered in a substantially constant horizontal position, a compensating arm 73 is rigidly secured to the brace 45 and extends upwardly and rearwardly therefrom. A rearwardly opening slot 74 is defined in the rearward end of the arm 73 as shown in FIGURES 2 and 7 for receiving the rockshaft 60. Accordingly, the arm 73 has a sliding and pivotal lost-motion connection with the rockshaft 60.

The mower 15 is adapted to be power driven from the tractor engine 12. Toward that result a power output pulley 75 is driven by the engine about a horizontal longitudinally extending axis and is disposed near the front of the tractor frame 11. A power input pulley 76 is mounted on the mower 15 for rotation about a substantially vertical axis. A flexible belt 77 drivingly couples the pulleys 75 and 76. A pulley assembly 78 is mounted on the anchor frame 16 beneath the output pulley 75. The assembly 78 includes a U-shaped hanger 79 pivotally mounted on the rod 23 as best shown in FIGURES 2 and 7. A pair of pulleys 80 and 81 are rotatably mounted on the respective legs of the hanger 79 and are disposed to engage the runs of the drive belt 77 to properly tension the same.

Means for adjusting the position of the pulley assembly 78 so as to vary the tension in the drive belt includes a bolt 82 connected to the hanger 79 and extending forwardly through the brace 19. A nut 83 is threadedly received on the bolt 82 abutting the brace 19 for providing the adjustment.

The mower 15 may include cutter blades and an interconnecting drive for the blades such as disclosed in the mower of the above-mentioned Marek patent.

OPERATION

The supporting and coupling apparatus of the invention is shown in FIGURE 7 prior to coupling the mower to the tractor. It will be seen that the draft linkage assembly 14, which includes the frame 40, is coupled to the tractor by simply moving the anchor frame 16 rearwardly toward the hitch assembly on the tractor. As the rod 23 enters the slot 31 of each socket assembly, the locking member 32 is cammed by the rod to pivot about the pin 33 opposite to the direction of arrow A as shown in FIGURE 6. As the rod 23 seats in the slot, the spring 35 pivots the locking pin 32 in the direction of arrow A to thus lock the rod in the socket assemblies. Concurrently, the fork portion 37 of each of the anchor plates 17 and 18 becomes seated on the bolt 39 on each side of the tractor frame to complete the coupling of the anchor frame on the tractor.

As the anchor frame 16 is coupled on the tractor as above described, the slot 74 on the compensating arm 73 is received on the rockshaft 60 as shown in FIGURE 2.

The coupling of the mower 15 to the draft linkage assembly is accomplished in an extremely quick and simple manner to be now described. The mower 15 is moved rearwardly with respect to the linkage assembly until the arms 41 and 42 are received within the openings of the respective collars 46 and 47. In conjunction with this step, the drive belt 77 is looped on the power output pulley 75 and the runs of the drive belt are positioned against the pulleys 80 and 81. The drive belt is then mounted on the mower pulley 76 with the pulleys 80 and 81 being adjusted to provide slack in the drive belt.

The rearward portion of the mower is then coupled to the ends of the draft links 21 and 22. The pin 56 on each of the brackets 54 and 55 is pulled outwardly against the force of spring 59 to retract the pin within the bracket. The pin may be retained in this retracted position by simply rotating the pin downwardly so that the handle portion of the pin engages the side of the bracket as shown in FIGURE 7. Upon positioning the draft link to align the opening 57 with the pin 56, the pin is then rotated upwardly so that the handle portion clears the bracket permitting the spring 59 to move the pin inwardly into the opening 57. The respective pins and draft links are shown in coupled relationship in FIGURES 1 and 2.

Having thus coupled the mower to the draft linkage assembly, the lifting structure is then connected between the tractor and the draft linkage assembly. This step is accomplished by interconnecting the lift arms 63 and 64 to the respective lifting links 65 and 66 by means of the pins 69 and 70, respectively. The drive belt 77 may then be tensioned by turning the nut 83 to draw the pulley assembly 78 forwardly.

It will be appreciated from the foregoing that the mounting of the draft linkage assembly on the tractor and the coupling of the mower to the draft linkage assembly is accomplished without the use of any tools and with a minimum of time and effort.

It will be understood that the mower and linkage assembly are dismounted from the tractor by reversing the above described steps. Features which facilitate the uncoupling procedure include the construction of the brackets 54 and 55 and the pins 56 enabling the pins to be set in a retracted position; the telescoping connection of the arms 41 and 42 within the collars 46 and 47 enabling the mower to be disconnected from the linkage assembly by simply moving the mower forwardly; and the provision of the bar 36 enabling the locking members 32 to be pivoted in unison to release the anchor frame 16 for forward movement out of the hitch assembly.

The apparatus of the invention provides a smoothly effective linkage permitting the mower to "float" with respect to the tractor during cutting and further providing that the mower may be raised and lowered in a substantially horizontal position. Features of the apparatus contributing to the floating action include the lost-motion connections between the rockshaft 60 and compensating arm 73; lift arms 63 and 64 and lifting links 65 and 66; and the arms 41 and 42 within the collars 46 and 47. As best shown in FIGURES 3 and 4, the opening 52 in each of the collars has a greater vertical extent than the vertical dimension of the respective arm within the opening. Accordingly, the forward end of the mower is free to move vertically without corresponding movement of the arms. The engagement of the arms 41 and 42 against the convex surface 53 of each of the collars 46 and 47 provides a simple and effective pivotal connection facilitating raising and lowering of the mower.

Various changes falling within the scope and spirit of the invention may occur to those skilled in the art. The apparatus is therefore not to be thought of as limited to the specific embodiment set forth.

What is claimed is:

1. An apparatus coupling and supporting an implement beneath a tractor for vertical movement, comprising in combination: a draft linkage assembly disposed beneath the tractor and above the implement, said assembly being coupled to the implement proximate to the forward and rearward portions of the implement; an anchor frame pivotally mounting the forward end of said linkage assembly forwardly of the implement; self-locking hitch means on the forward portion of the tractor for mounting said linkage assembly on the tractor in response to movement of said anchor frame into said hitch means; and lift means interconnecting said linkage assembly with the tractor rearwardly of said anchor frame for pivoting said assembly about its connection with said anchor frame to raise and lower the implement, and said linkage assembly is coupled to the rearward portion of the implement by means including locking pin means slidably mounted on the implement, said linkage assembly having an opening defined therein for receiving said pin means, and spring means operatively associated with said pin means for biasing said pin means into said opening.

2. An apparatus coupling and supporting an implement beneath a tractor for vertical movement, comprising in combination: a draft linkage assembly disposed beneath the tractor and apove the implement, said assembly being coupled to the implement proximate to the forward and rearward portions of the implement; an anchor frame pivotally mounting the forward end of said linkage assembly forwardly of the implement; self-locking hitch means on the forward portion of the tractor for mounting said linkage assembly on the tractor in response to movement of said anchor frame into said hitch means; and lift means interconnecting said linkage assembly with the tractor rearwardly of said anchor frame for pivoting said assembly about its connection with said anchor frame to raise and lower the implement, and said linkage assembly is coupled to the forward portion of the implement by means including a frame mounted on the linkage assembly and having a forwardly extending frontmost end, collar means mounted on the forward portion of the implement disposed for telescopically receiving said frontmost end of said frame whereby the forward portion of the implement is mountable on said linkage assembly in response to rearward movement of the implement with respect to said frame to position said frontmost end in said collar means.

3. An apparatus for mounting a mower beneath a tractor for vertical movement, comprising in combination: a draft linkage assembly disposed beneath the tractor and above the mower; means coupling the forward portion of the mower to said linkage assembly including a frame pivotally mounted on said assembly and having a forwardly extending end; collar means on the mower disposed for telescopically receiving said end of said frame whereby the forward portion of the mower is mountable on said assembly in response to rearward movement of the mower with respect to said frame to position said end in said collar means; means coupling the rearward portion of the mower to said linkage assembly including locking pin means slidably mounted on the mower, said linkage assembly having an opening defined therein for receiving said pin means, and spring means operatively associated with said pin means for biasing said pin means into said opening; an anchor frame pivotally mounting the forward end of said linkage assembly forwardly of the mower; self-locking hitch means on the forward portion of the tractor for mounting said linkage assembly on the tractor in response to movement of said anchor frame into said hitch means; and lift means interconnecting said linkage assembly with the tractor rearwardly of said anchor frame for pivoting said assembly about its connection with said anchor frame to raise and lower the mower.

4. The subject matter of claim 3, in which said hitch means includes a pivotally mounted lock assembly for retaining said anchor frame in mounted position on the tractor and being pivotable to permit removal of said anchor frame from the tractor.

5. In a linkage system adapted to facilitate coupling of an implement to the frame of a tractor, the improvement comprising: self-locking hitch means on the forward portion of the tractor frame and including a pair of socket assemblies spaced apart transversely of said frame; and an anchor frame adapted to be coupled to the implement, said anchor frame including means receivable in said socket assemblies in response to movement of said anchor frame onto said hitch means, whereby the anchor frame is mountable on the tractor frame for coupling the implement thereto, and said anchor frame includes a pair of interconnected plates being spaced so as to be disposed on opposite sides of the tractor frame when said anchor frame is coupled in said hitch means, each of said plates including an elongated fork portion defining a rearwardly opening slot, and means projecting transversely from each side of the tractor frame for fitting within each of said slots to stabilize said anchor frame when mounted on the tractor frame.

6. In a linkage system adapted to facilitate coupling of an implement to the frame of a tractor, the improvement comprising: self-locking hitch means on the forward portion of the tractor frame and including a pair of socket assemblies spaced apart transversely of said frame; and an anchor frame adapted to be coupled to the implement, said anchor frame including means receivable in said socket assemblies in response to movement of said anchor frame onto said hitch means, whereby the anchor frame is mountable on the tractor frame for coupling the implement thereto, and each of said socket assemblies includes a forwardly opening slot disposed to receive said means receivable in said socket assemblies in response to rearward movement of said anchor frame relative to the tractor frame.

7. In a linkage system adapted to facilitate coupling of a power driven implement to the frame of a tractor having a power output pulley proximate to the forward end thereof, a power input pulley on the implement, and a drive belt drivingly coupling the pulleys, wherein the improvement comprises: self-locking hitch means on the forward portion of the tractor frame beneath the power output pulley and including a pair of socket assemblies spaced apart transversely of the tractor frame; an anchor frame adapted to be coupled to the implement, said anchor frame including means receivable in said socket assemblies in response to movement of said anchor frame into said hitch means, whereby said anchor frame is mountable on the tractor frame for coupling the implement thereto; and pulley means mounted on said anchor frame so as to be disposed beneath said power output pulley when said anchor frame is mounted on said hitch means for engaging the drive belt to tension the same between the output and input pulleys, and said anchor frame includes a pair of interconnected plates being spaced apart so as to be disposed on opposite sides of the tractor frame when said anchor frame is coupled in said hitch means, each of said plates including an elongated fork portion defining a rearwardly opening slot, and means projecting from each side of the tractor frame for fitting within each of said slots to stabilize said anchor frame when mouted on the tractor frame.

8. In a linkage system adapted to facilitate coupling of a power driven implement to the frame of a tractor having a power output pulley proximate to the forward end thereof, a power input pulley on the implement, and a drive belt drivingly coupling the pulleys, wherein the improvement comprises: self-locking hitch means on the forward portion of the tractor frame beneath the power output pulley and including a pair of socket assemblies spaced apart transversely of the tractor frame; an anchor frame adapted to be coupled to the implement, said anchor frame including means receivable in said socket assemblies in response to movement of said anchor frame into said hitch means, whereby said anchor frame is mountable on the tractor frame for coupling the implement thereto; and pulley means mounted on said anchor frame so as to be disposed beneath said power output pulley when said anchor frame is mounted on said hitch means for engaging the drive belt to tension the same between the output and input pulleys, and each of said socket assemblies includes a forwardly opening slot disposed to receive said means receivable in socket assemblies in response to rearward movement of said anchor frame relative to the tractor frame.

9. In a linkage system adapted to facilitate coupling of a power driven implement to the frame of a tractor having a power output means proximate to the forward end thereof, a power input means on the implement and a drive means drivingly coupling the power output means and the power input means, wherein the improvement comprises: self-locking hitch means on the forward portion of the tractor frame beneath the power output means and including a pair of socket assemblies spaced apart transversely of the tractor frame; an anchor frame adapted to be coupled to the implement, said anchor frame including means receivable in said socket assemblies in response to movement of said anchor frame onto said hitch means, whereby said anchor frame is mountable on the tractor frame for coupling the implement thereto; and power transfer means mounted on said anchor frame so as to be disposed beneath said power output means when said anchor frame is mounted on said hitch means for transferring power drive from said power output means to said power input means through said drive means, and said anchor frame includes a pair of interconnected plates being spaced apart so as to be disposed on opposite sides of the tractor frame when said anchor frame is coupled on said hitch means, each of said plates including an elongated fork portion defining a rearwardly opening slot, and means projecting from each side of the tractor frame for fitting within each of said slots to stabilize said anchor frame when mounted on the tractor frame.

10. In a linkage system adapted to facilitate coupling of a power driven implement to the frame of a tractor having a power output means proximate to the forward end thereof, a power input means on the implement and a drive means drivingly coupling the power output means and the power input means, wherein the improvement comprises: self-locking hitch means on the forward portion of the tractor frame beneath the power output means and including a pair of socket assemblies spaced apart transversely of the tractor frame; an anchor frame adapted to be coupled to the implement, said anchor frame including means receivable in said socket assemblies in response to movement of said anchor frame onto said hitch means, whereby said anchor frame is mountable on the tractor frame for coupling the implement thereto; and power transfer means mounted on said anchor frame so as to be disposed beneath said power output means when said anchor frame is mounted on said hitch means for transferring power drive from said power output means to said power input means through said drive means, and each of said socket assemblies includes a forwardly opening slot disposed to receive said means receivable in said socket assemblies in response to rearward movement of said anchor frame relative to the tractor frame.

References Cited

UNITED STATES PATENTS 3,283,486   11/1966   Marek et al. _____ 56—25.4

FOREIGN PATENTS 664,894   6/1963   Canada.

LOUIS G. MANCENE, Primary Examiner

J. A. OLIFF, Assistant Examiner